(12) United States Patent
Ponnuswamy et al.

(10) Patent No.: US 12,248,585 B2
(45) Date of Patent: Mar. 11, 2025

(54) RUNTIME RISK ASSESSMENT TO PROTECT STORAGE SYSTEMS FROM DATA LOSS

(71) Applicant: Dell Products L.P., Round Rock, TX (US)

(72) Inventors: Senthil Ponnuswamy, San Jose, CA (US); Mahadev Karadigudda, San Jose, CA (US); Madhu Agrahara Gopalakrishna, Fremont, CA (US); Praveen Kumar Lakkimsetti, Hayward, CA (US)

(73) Assignee: Dell Products L.P., Round Rock, TX (US)

( * ) Notice: Subject to any disclaimer, the term of this patent is extended or adjusted under 35 U.S.C. 154(b) by 497 days.

(21) Appl. No.: 17/576,115

(22) Filed: Jan. 14, 2022

(65) Prior Publication Data
US 2023/0229792 A1    Jul. 20, 2023

(51) Int. Cl.
*G06F 21/60*    (2013.01)
*G06F 21/55*    (2013.01)

(52) U.S. Cl.
CPC .......... *G06F 21/604* (2013.01); *G06F 21/554* (2013.01); *G06F 2221/2101* (2013.01); *G06F 2221/2137* (2013.01)

(58) Field of Classification Search
CPC ................. G06F 21/554; G06F 21/604; G06F 2221/2101; G06F 2221/2137
See application file for complete search history.

(56) References Cited

U.S. PATENT DOCUMENTS

| | | | | |
|---|---|---|---|---|
| 7,212,731 B1* | 5/2007 | Morotomi | ............ | H04N 23/661 386/323 |
| 8,621,644 B2* | 12/2013 | Chan | ........................ | G06F 21/79 726/26 |
| 8,661,551 B2* | 2/2014 | Chan | ........................ | G06F 3/067 726/26 |
| 8,887,294 B2* | 11/2014 | Chan | ................... | G06F 12/1433 726/26 |
| 9,064,130 B1* | 6/2015 | Asheghian | .......... | G06F 21/6281 |
| 9,075,851 B2* | 7/2015 | Kilian | ................. | G06F 16/2477 |
| 9,588,977 B1* | 3/2017 | Wang | ........................ | G06F 16/13 |
| 9,912,752 B1* | 3/2018 | Davis | .................. | G06F 16/2365 |
| 9,953,178 B2* | 4/2018 | Umbehocker | ....... | G06F 21/6218 |
| 9,959,280 B1* | 5/2018 | Whitehead | .............. | G06F 16/13 |

(Continued)

*Primary Examiner* — Sharon S Lynch
(74) *Attorney, Agent, or Firm* — Staniford Tomita LLP

(57) ABSTRACT

Embodiments of the runtime risk assessment process monitors deliberate or potentially data destructive operations against a filter of dynamic risk assessment. A filter process recognizes the following conditions as highly indicative of increased risk factors: (1) recent creation of the security officer role, (2) changing of the system time or clock, and (3) disabling of system alerts. If all three of these events occur, the system recognizes this as indicative of a high probability of data attack. The runtime risk assessment process imposes a delay on the execution of each of these commands to provide time to alert the user and an opportunity to re-enter the commands at the end of the delay period. Thus, a potentially dangerous sequence of commands will not occur automatically or immediately, but will instead be delayed to provide an extra validation check or user action.

14 Claims, 4 Drawing Sheets

(56) References Cited

U.S. PATENT DOCUMENTS

| | | | | |
|---|---|---|---|---|
| 10,540,508 B2* | 1/2020 | Byun | | G06F 21/6209 |
| 10,838,828 B2* | 11/2020 | Bourgeois | | G06F 16/334 |
| 11,237,921 B2* | 2/2022 | LeCrone | | G06F 11/1471 |
| 11,429,658 B1* | 8/2022 | Richter | | G06F 16/483 |
| 11,556,379 B2* | 1/2023 | Rath | | G06F 9/4881 |
| 11,645,236 B2* | 5/2023 | Rath | | G06F 11/1453 |
| | | | | 707/640 |
| 11,893,109 B2* | 2/2024 | Pientka | | G06F 11/1464 |
| 2005/0125411 A1* | 6/2005 | Kilian | | G06F 16/2477 |
| 2005/0195660 A1* | 9/2005 | Kavuri | | G06F 3/0685 |
| | | | | 365/189.05 |
| 2005/0273568 A1* | 12/2005 | Blandy | | G06F 12/023 |
| | | | | 711/170 |
| 2006/0020911 A1* | 1/2006 | Lyons | | G06F 9/526 |
| | | | | 717/101 |
| 2007/0143792 A1* | 6/2007 | Acton | | G06F 16/289 |
| | | | | 725/50 |
| 2007/0162527 A1* | 7/2007 | Wright | | G06F 12/0261 |
| 2008/0083037 A1* | 4/2008 | Kruse | | G06F 21/88 |
| | | | | 726/27 |
| 2010/0092160 A1* | 4/2010 | Bhogal | | G11B 27/034 |
| | | | | 386/241 |
| 2010/0318584 A1* | 12/2010 | Krishnaprasad | | G06F 12/0253 |
| | | | | 707/812 |
| 2011/0067084 A1* | 3/2011 | Byun | | G06F 16/217 |
| | | | | 726/4 |
| 2011/0191485 A1* | 8/2011 | Umbehocker | | H04L 63/0428 |
| | | | | 709/229 |
| 2011/0225214 A1* | 9/2011 | Guo | | G06F 3/0641 |
| | | | | 707/813 |
| 2012/0066193 A1* | 3/2012 | King | | G06F 12/0269 |
| | | | | 707/704 |
| 2013/0174264 A1* | 7/2013 | Chan | | G06F 21/88 |
| | | | | 726/26 |
| 2014/0143884 A1* | 5/2014 | Chan | | G06F 12/0246 |
| | | | | 726/26 |
| 2015/0180894 A1* | 6/2015 | Sadovsky | | H04W 12/12 |
| | | | | 726/22 |
| 2017/0139824 A1* | 5/2017 | Dragoljevic | | G06F 12/0261 |
| 2018/0089110 A1* | 3/2018 | Zhou | | G06F 3/0623 |
| 2019/0034295 A1* | 1/2019 | Bourgeois | | G06F 16/125 |
| 2020/0326878 A1* | 10/2020 | Bora | | G06F 3/067 |
| 2020/0334143 A1* | 10/2020 | Noto | | G06F 9/505 |
| 2020/0341689 A1* | 10/2020 | Smith | | G06F 3/0614 |
| 2021/0157680 A1* | 5/2021 | LeCrone | | G06F 11/1464 |
| 2021/0224379 A1* | 7/2021 | Pientka | | G06F 11/1464 |
| 2022/0083514 A1* | 3/2022 | Rath | | G06F 11/1451 |
| 2022/0222074 A1* | 7/2022 | Rath | | G06F 11/0757 |
| 2023/0179577 A1* | 6/2023 | Bennati | | H04L 63/0414 |
| | | | | 380/255 |
| 2023/0267100 A1* | 8/2023 | Rath | | G06F 11/1451 |
| | | | | 707/640 |

\* cited by examiner

RUNTIME RISK ASSESSMENT TO PROTECT STORAGE SYSTEMS FROM DATA LOSS

TECHNICAL FIELD

Embodiments relate generally to data storage system protection, and more particularly to performing runtime risk assessments.

BACKGROUND OF THE INVENTION

With the increasing need to secure data access in data storage systems, it is necessary to ensure that data is secure throughout its lifecycle from primary (active tier) to secondary (cloud/long-term) storage. It is also imperative to protect against full and partial deletion of user data.

In a deduplication data storage system, user data is backed up as files under one or more Merkle tree data structures. These can be spread across different storage tiers, such as: active, archive, cloud (from one or more cloud providers), and so on. Once backed up, a user expects and relies on such copies to be reliable. However, in some cases either during decommissioning or reinitializing of a secondary storage system, such data needs to be destroyed. To support such use cases, a storage system may offer one or more operations that users perform to delete data, either on a system-wide basis or on a tier-wide basis. These features, however, can be exploited and used by intruders resulting in unintended data loss. Ransomware attacks are a common example of this vulnerability.

Valid and approved data destruction operations are required to be performed by users with administrative roles and to be authorized by appropriate personnel, such as security officers in an organization. Such personnel are usually very useful in protecting customer from total data loss either system or tier-wide. However, many storage systems do not require these authorizing users to be added during initial configuration and instead allow for dynamic addition of such authorizing roles, such as by admin users or 'super users'. Likewise, organizations that do not intend to run any of the operations that require authorization may not have pre-created such roles. This allows a malicious actor with access to just admin user credentials to create/add such a secure user and use it to authorize data destructive operations.

What is needed, therefore, is a data security mechanism that protects against improper use of security officer tasks allowing for destruction of user data.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, and Data Domain Restorer are trademarks of Dell EMC Corporation.

BRIEF DESCRIPTION OF THE DRAWINGS

In the following drawings, like reference numerals designate like structural elements. Although the figures depict various examples, the one or more embodiments and implementations described herein are not limited to the examples depicted in the figures.

DETAILED DESCRIPTION

Figure 1:
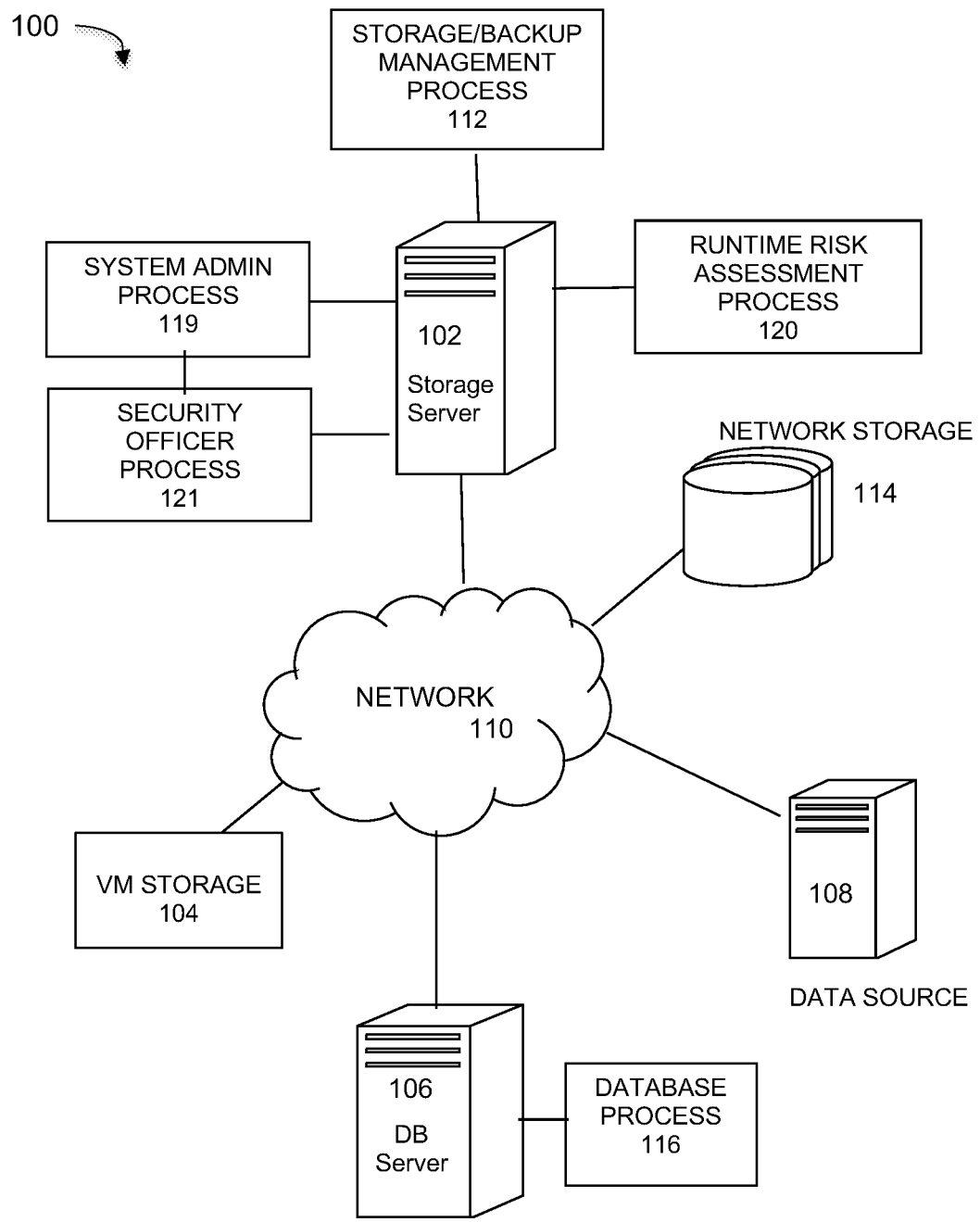
FIG. 1 is a diagram of a computing network implementing a runtime risk assessment for data destructive operations, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve software and systems deployed in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments of a storage system data security mechanism to dynamically detect potentially unintended/intruder access to the system and blocks off certain data destructive operations to protect customers data. Such a mechanism can be based on multiple configuration parameter changes within a small window of time, to evaluate risk at runtime. Embodiments provide a storage system that evaluates risk to customers data at runtime and protects against total data loss events. This runtime risk assessment is based on: monitoring user operations that can lead to data destruction, dynamically validating whether the system has been accessed in a compromised way and if so, flag the destructive operation as a malicious attempt, and if a malicious attempt is detected, disabling data destructive operations for a window of time and raise alerts to inform the customer of such an event.

FIG. 1 illustrates a networked data storage system that implements one or more embodiments of a runtime risk assessment process for data destructive operations, under some embodiments. In system 100, a storage server 102 executes a data storage or backup management process 112 that coordinates or manages the backup of data from one or more data sources 108 to storage devices, such as network storage 114, client storage, and/or virtual storage devices 104. With regard to virtual storage 104, any number of virtual machines (VMs) or groups of VMs (e.g., organized into virtual centers) may be provided to serve as backup targets. The VMs or other network storage devices serve as target storage devices for data backed up from one or more data sources, such as storage server 102 or data source 108, in the network environment. The data sourced by the data source may be any appropriate data, such as database data that is part of a database management system, and the data may reside on one or more hard drives for the database(s) in a variety of formats. Thus, a data source maybe a database server 106 executing one or more database processes 116, or it may be any other sources data for use by the resources of network 100.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

The storage resources in system 100 may be organized into different tiers based on the data type and storage mode. For example, regular user data may be stored locally in hard disk storage referred to as the 'active' or 'primary' tier, while legacy data or data moved to long-term storage may be stored in the cloud or older storage devices (e.g., tape) and referred to as 'cloud' or 'secondary' tier data. Other data storage tiers may include frequently used or recently used data that is stored in fast memory caches and referred to as 'cache tier' data.

Data Domain is an example of a purpose-built backup appliance providing streaming deduplication that is able to ingest data at full network speeds, from multiple backup sources while providing storage efficiency. The Data Domain File System (DDFS) is an inline data deduplication file system. As data gets written to the file system, DDFS breaks it into variable sized segments and a group of segments are packed in a compression region. A number of compression regions are grouped together and written as a container to disk. DDFS calculates fingerprint signatures for each segment using SHA1 algorithm. DDFS has an on-disk fingerprint index table, which maps the fingerprint to the container-ID, that has the corresponding segment data. The container has a metadata section followed by several data sections. The data sections store the compression regions; and the container metadata section stores the meta information of the container, i.e., it stores the total number of compression regions, the total number of segments, the fingerprint of each segment, and so on.

In a deduplicated file-system, such as DDFS, that forms segments from data, these segments are uniquely identified by their key/label called a fingerprint. Given a file offset and length, the corresponding data segment fingerprints need to be looked up. To provide faster offset to fingerprint lookup the mapping is stored in a Merkle tree format where the leaf nodes represent data segments and their fingerprints are stored in the parent nodes which are metadata segments. In a Merkle tree, every non-leaf node is labeled with the hash of the labels of its children nodes to allow efficient and secure verification of the contents of large data structures.

A DDFS file is thus represented by a Merkle tree, a B+Tree or a modified B+Tree (MTree) with user data as variable sized segments at the bottom level of the tree, referred to as L0 segments. The SHA1 fingerprints of those segments are grouped together at the next higher level of the tree to form new segments, referred to as L1 segments. SHA1 fingerprints of L1 segments are grouped together as L2 segments, and this continues up to L6 which represents the entire file. The top segment of the tree is always an L6 segment, even though it may refer to any lower numbered segments. We refer to segments above L0 as Lp chunks. The L6 segment of every file is stored in a namespace which is represented as a B+Tree. The L0 and Lp segments are written to separate containers, known as L0 and Lp containers.

The Merkle tree organized data may be spread across various data storage tiers (e.g., active and cloud tiers). Active or primary data is typically in present usage by one or more applications, and creation/modification/destruction of data in this tier is usually directly controlled by the users and applications. Any destruction of data is thus usually limited to specific user or application data and performed through directly executed application processes. Secondary or cloud tier data, on the other hand, is data that is backed up and stored for long-term storage and is not normally accessed by active applications, unless restored or moved to the active tier. Modification or destruction of secondary tier data thus normally done by special processes that delete great amounts of data at one time, such as on a system-wide or tier-wide basis. Dedicated applications, such as data purging, disk re-formatting, decommissioning, or reinitialization may be used to destroy this type of data. Typically, these types of data destruction operations involve several discrete tasks and are allowed to be performed only by system administrators. In many systems, an additional user known as a security officer (SO) is needed to authorize any data destructive operations initiated by a system administrator.

This system of checks and authorizations usually work well enough to protect against total data loss in most instances. However, such protection requires that the organization implement strict policies and procedures to define and coordinate system administrator and security officer (authorization) roles and tasks. Many times, role assignments, privileges and data access powers are not defined in a timely or robust enough manner, and these shortcomings can be easily exploited by attackers who intend to destroy or compromise an organization's data.

In an embodiment, system 100 includes a runtime risk assessment process that monitors user operations that can lead to data destruction, dynamically validate whether the system has been accessed in a compromised way and if so, flag the destructive operation as a malicious attempt, and if such a malicious attempt is detected, disable data destructive operations for a window of time and raise alerts to inform the customer of such an event.

For the embodiment of FIG. 1, a data storage and processing server, such server 103 executes one or more applications that can create, move, and destroy data, such as through storage/backup management process 112, in any storage tier. A system administrator through one or more consoles or system admin (sysadmin) processes 119 controls the installation, initialization, re-initialization, de-installation of the server applications and processes, including the backup programs 112. Many of these operations, especially re-initialization and de-installation or decommissioning involve deliberate destruction of potentially large amounts of stored user data within a short period of time, such as a single program execution time. A security officer process 121 is provided to allow a security officer to be assigned and given the task to authorize any such deliberate destruction of data by the system admin. As stated above, there are certain instances where a security officer process 121 is not implemented or is assigned in such a way that introduces vulnerabilities in the system with respect to potential attacks.

Deliberate malicious attacks by hackers, data thieves, and so on usually conform to recognizable patterns. For example, a typical attack usually involves appointing a security officer, advancing the system clock, turning off alerts, and performing a large-scale data destroy or move operation. Similarly, such attacks are usually committed on weekends or holidays, and are of relatively short duration, e.g., typically 10 to 20 minutes, depending on the amount of data involved. Other similar or additional acts may also be involved, as identified by ongoing attempts to recognize and thwart data attacks.

Embodiments of the runtime risk assessment process 120 monitor deliberate or potentially data destructive operations against a filter of dynamic risk assessment. In an embodiment, the filter recognizes the following conditions as highly indicative of increased risk factors: (1) recent creation of the security officer role, (2) changing of the system time or clock, and (3) disabling of system alerts. If any of these three events occur and is followed by a data destruction command, the system recognizes this as indicative of a high probability of data attack. The runtime risk assessment process 120 will then impose a delay on the execution of the data destruction command issued after any of these commands to provide time to alert the user and give him or her an opportunity to retry the data destruction at the end of the delay period. In this way, a potentially dangerous sequence of commands will not occur automatically or immediately, but will instead be delayed to provide an extra validation check or require further user input to carry out the data destruction.

For purposes of description, the above described conditions might represent specific user commands to perform a task that is deemed potentially dangerous when accompanied by a data destruction command, such as assigning the security officer role, or an event that is triggered by a user action or automated process to perform the task, or any similar initiation process. Such triggering events are interchangeably referred to as 'monitored or filtered events,' 'conditions,' and so on. In an embodiment, the monitored event is executed upon entry, but the data destruction event right after it is delayed and must be explicitly retried by the user after the end of the delay period. Thus, an attacker may be able to change the security officer role, but cannot immediately destroy data thereafter. An alert is sent to the user and he or she can then go back and re-set the security officer role, if necessary.

Figure 2:
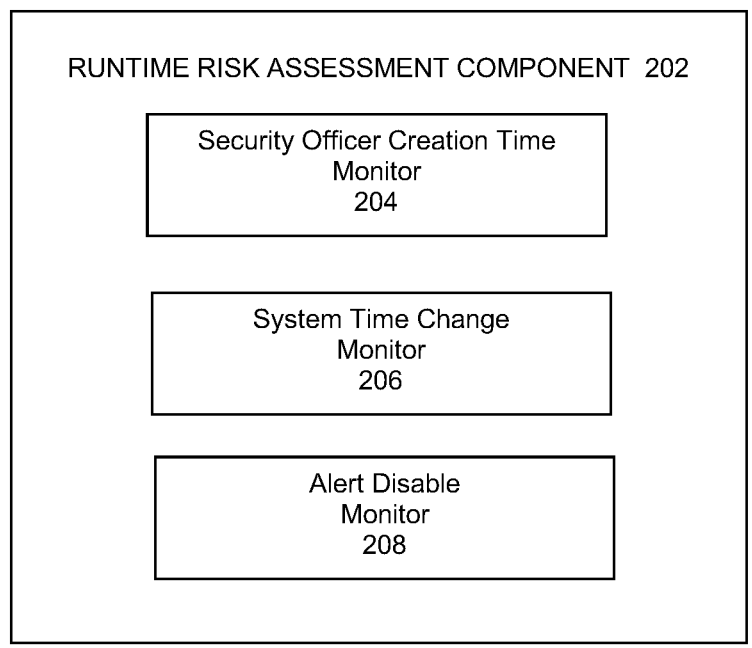
FIG. 2 illustrates some processing components of the dynamic risk assessment process, under some embodiments.

FIG. 2 illustrates some processing components of the dynamic risk assessment process, under some embodiments. As shown in FIG. 2, the runtime risk assessment process is performed by a corresponding processing component 202 that includes certain monitoring sub-components.

In a deduplication storage system such as DDOS, there are certain operations that will result in user data being destroyed. These are provided for users while they decommission systems or repurpose/reinitialize systems. Such operations typically require authorizations from a security officer, or any user given an appropriate security role, to allow the system administrator to carry out the destructive operations. This is to prevent a single user (e.g., sys admin) to be treated as a single point of defense. However, many deduplication systems do not require a security officer user to be pre-created or defined at system initialization. In such a use case, an admin user can add a security officer and subsequently that person could authorize data destructive operations. Likewise, an attacker having access to system administrator user credentials can potentially create a security officer and then issue data destructive operations.

The security officer creation time monitor 204 keeps track of the creation of the security officer role by the system administrator. As stated above, many systems do not provide for the creation of a security officer role upon initial installation and deployment. Instead, this role is created after a system is up and running. Since it must be created, attackers may create a security officer role as a prelude to an attack, and evidence has shown that destructive acts usually involve the creation of a security officer as a first step, followed quickly by the data destruction attempt. A window of time is thus defined within which data destruction soon after the creation of the security officer role will be flagged as potentially dangerous and will be delayed. In an embodiment, the security officer creation time window ($SO_{tw}$) can either be a parameter that is hard-coded in the system or set by the user. Any attempted destruction of data during this time window after the security officer creation will be disallowed. This introduces a delay of any data destructive operations for a window of time from the time the security officer was created.

The system time (or clock) change monitor 206 keeps track of any change of the system clock, defines a time window for flagging a data destruction operation as dangerous, and disallows any data destructive operations for this window of time after the system time is updated. Upon initiation of a data destructive operation, if system time is recognized to have been updated recently, the data destructive operation will be blocked off. In an embodiment, the system clock change time window ($CLK_{tw}$) can either be a parameter that is hard-coded in the system or set by the user. Any attempted destruction of data during this time window after the system clock has been changed will be disallowed or blocked. This introduces a delay of any data destructive operations for a window of time from the point that the system clock was changed.

Alerts are one of the primary mechanisms to warn users of any significant configuration change and/or intruder-based activity. Therefore, malicious users tend to disable alerts as a first act. The runtime risk assessment process/component 202 includes an alert disable monitor 208. This component monitors alert configuration changes (particularly to security category alerts), defines an alert disable time window ($AD_{tw}$), and disallows data destructive operations that are attempted within this window of time. Along with this, users are notified of the alert configuration changes at the prior email address, if that address is modified or cleared. This introduces a delay of any data destructive operations for a window of time from the point that the alerts were disabled.

Although embodiments are described with respect to the above-described monitored and filtered events (creation of the security role, system time change, or system alert disablement), embodiments are not so limited, and other similar events may also be processed depending on system configuration and use. Likewise, as described above, the detection of any of the monitored events will lead to a block and delay of a sufficiently close data destruction command. These events are thus monitored and blocked individually. Alternatively, monitored events can be grouped such that certain combinations must be detected to force the blocking of the data destructive command, for example only a change of system clock and alert disablement will force the blocking, rather than detecting either the system clock change or alert disablement. This can be useful if only particular patterns of attack constituting a combination of specific commands are desired to be defended against.

Figure 3:
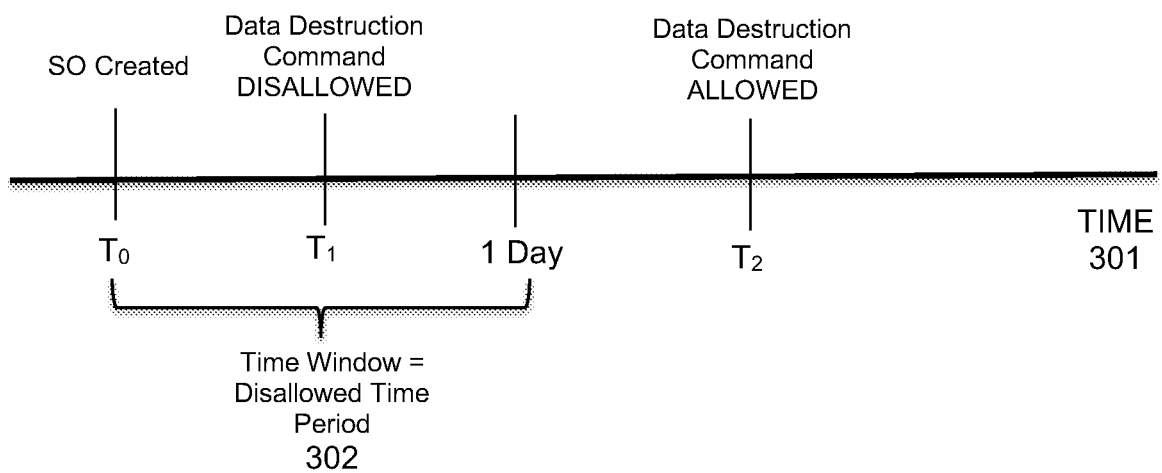
FIG. 3 illustrates an example of a delay in a data destruction command when attempted during a time window of a monitored command, under some embodiments.

FIG. 3 illustrates an example of a delay in a data destruction command when attempted during a time window of any monitored event, under some embodiments. FIG. 3 illustrates certain events along a time line. The example of FIG. 3 applies to the case of the creation of a security officer (SO), however the example applies to the other conditions of system clock change and alert disablement, as well. As shown in FIG. 3, the SO role is created at a certain time, $T_0$ along time axis 301. For this example, the SO time window is 24 hours. If a data destruction command is attempted during this period $T_0$ to 1 day, it will be disallowed. If it is a genuine attempt to destroy data, the user will need to retry the command after the 1 day period. If however, the data destruction command is entered after the 1 day time period, it will be allowed.

The time windows for each of the above conditions thus represent an amount of delay of a data destruction command for each of the monitored conditions. As shown in the example of FIG. 3, this is shown as a one-day (24 hour) time window, but any practical time interval is possible. Similarly, the interval of a day or days can comprise natural days or business days, as appropriate for the system.

The time window for each condition is a delay parameter that can be hardcoded in the system or set by the user. Such a delay may depend on the data storage system itself, as well as the monitored event. For example, a Data Domain system may use a delay of one or two days for all three monitored conditions, while an integrated system, such as IDPA (integrated product offering bundling DDOS, backup app and ACM) may use a delay of five days. The same time window can be used for all three conditions, or different conditions use different time windows.

As shown in FIG. 3, the delay period 302 represents an amount of time after the monitored condition that the attempted command is disallowed before the data destruction command is allowed to be re-tried. After the delay period, the data destruction command is not automatically performed, but instead the user must explicitly retry this operation. For example, if the security officer role was created at a time $T_0$ and the data destruction was attempted at a time $T_1$ that is within the time window 302, it would need to be manually retried at a time $T_x$ after the 1 day time.

In an embodiment, if an attempted data destruction command occurs within the time window of a monitored condition, that command is disallowed and an alert is sent to the user to let them know of potential unauthorized operations. That allows the user to be aware of and log such data breach potentials, as well as take additional remedial measures, such as impose comprehensive system monitoring, data auditing, and other protections.

The example of FIG. 3 illustrates certain triggering events that lead to prevention of data being destroyed. For this example, once a security officer is created, its creation time (To) is noted. Subsequently, when a data destruction operation is issued either by a bad actor or by user, that operation must be issued with admin credentials and it must be authorized by a security officer. However, if the data destruction command is issued within 24 business hours of security officer creation itself, then the command is considered to be a risky operation and it is disallowed. For bad actors, this mechanism blocks them off, while generating critical alerts notifying users that such an attempt was made. In the genuine case where users themselves are looking to destroy data, the process adds a 24 hour delay. In most cases, this amount of delay may be annoying, but is generally acceptable if the data is valuable, and especially when such operations are usually done in a larger window to decommission a system or similar operation.

In certain cases, data destruction following one of the monitored conditions may be valid and justified. For example, upon initial configuration and installation, users will both define certain roles, possibly including the security officer, change the system clock, and/or disable alerts, as well as attempt to destroy some data. In this case, introducing a delay may be too disruptive. Similarly, if user is performing a system reinstall or reconfiguration, the above restrictions may block them from doing that reset (which will involve data destruction), for a window of time. In an embodiment, the runtime risk assessment process 120 includes a bypass that lifts the disallowed time period if certain de-risking factors are detected. These de-risking factors include the recent creation (installation/configuration) of a system or filesystem, or a low utilization of storage capacity utilization. Such cases represent low risk cases since the amount of data at risk of being lost is too low and/or of insignificant value.

The protective measure of forcing a disallowed time period is not exercised unless there is an attempt to destroy user data and a de-risking factor is not encountered. For example, an initial configuration of a deduplication storage system may involve many steps (especially for an integrated product suite), and users may miss a step or two in that process, thus necessitating re-entry of data, or a 'factory reset' to start over. Such a reset step will end up manifesting as a data destroy operation in DDOS. To not add unnecessary delay in such cases, the runtime risk assessment process 120 uses two additional parameters that represent the de-risking factors.

The first de-risking factor is the capacity ingestion rate. For measuring this capacity, on an ongoing basis, DDFS monitors the amount of data ingested to it, and it also knows the maximum capacity of the system. This is used to then calculate what percentage of capacity has been utilized on the system. If the data capacity ingested is lower than a percentage threshold (e.g., <2%), the disallowed time window restriction will be lifted. The rationale for this is at such times, there should be only very little metadata that is be stored in the system. The 2% threshold is provided as an example only, and other percentage thresholds can be used depending on system configuration and data usage patterns.

The second de-risking factor is that if the system or filesystem was created within a certain time threshold (e.g., in the last 5 business days). The rationale is that a newly installed or re-installed system will have a lot of instances where roles are assigned and de-assigned, alerts and clocks are set and reset, and so on. During this time, the operating systems are new so the monitored events may be triggered, but no real data is being processed anyway. Since user interaction can be quite intense during this time, the delays associated with the monitored events are not imposed. The five day threshold value is provided as an example only, and time periods (typically on the order of days) can be used depending on system configuration and user input patterns.

In an embodiment, either de-risking factor may be met to suspend the blocking of the data destructive event. That is, if either the data ingestion rate is very low or the system is new, no blocking will occur, and the data destruction command will be executed upon initiation by the user. Alternatively, the system could be configured such that both de-risking factors must be satisfied, before the data destructive operations are blocked. This could be useful for systems that routinely have very low data ingestion rates, or systems that are routinely re-configured and quickly have high data ingestion rates.

Figure 4:
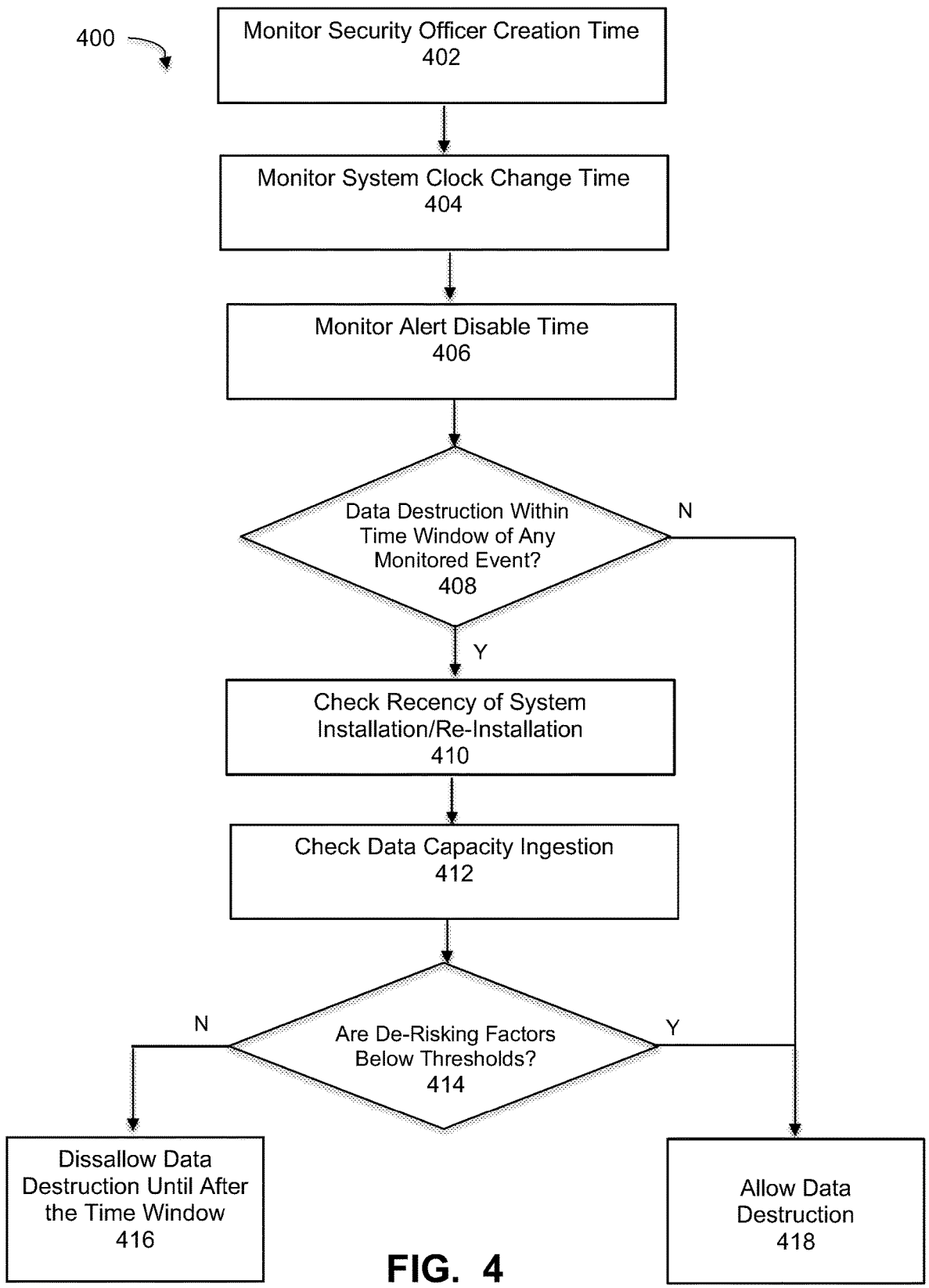
FIG. 4 is a flowchart that illustrates a method of performing runtime risk assessment to protect against potential data loss, under some embodiments.

FIG. 4 is a flowchart that illustrates a method of performing runtime risk assessment to protect against potential data loss, under some embodiments. FIG. 4 describes a workflow 400 to analyze multiple system configuration changes within a short period of time to detect runtime risk to the storage system and to block data destructive operations to protect from total data loss. The process quantifies risk to avoid total data loss using vectors including: risking factors such as (1) recency of updates to an authorizing user (2) recency of system time updates (3) time of recent changes to security threat notification settings, and decoupled with de-risking factors, such as the recency of initial configuration of the storage system, and the amount of user data backed up in the storage system.

Process 400 begins by monitoring the three conditions representing the risking factors, that is, the runtime risk assessment process 120 monitors the security officer creation time, 402, the system clock change time, 404, and the alert disable time, 406. Each of these has an associated time window, or utilizes the same time window. If the data destruction command is attempted outside or after this time window, this is considered low risk and the command is allowed, 418. However, if the data destruction command is entered within the time window for any of the conditions, the command is considered risky, and de-risking factors are the checked. Thus, in steps 410 and 412, the system respectively checks for the recency of the system installation or re-installation and the amount of data capacity ingestion. If either of these factors are below their respective threshold values, the attempted data destruction is again considered low risk and is allowed, 418. However, if the de-risking factors are not met, the risk determined in step 408 still exists and the attempted data destruction command is disallowed for the specified time period, 416. During this time period, the user is alerted as to the attempted data destruction, and after this time period elapses the user may re-try the data destruction if it was a genuine user authorized operation.

Embodiments of the processes and techniques described above can be implemented on any appropriate data storage or backup system operating environment or file system, or network server system. Such embodiments may include other or alternative data structures or definitions as needed or appropriate.

Figure 5:
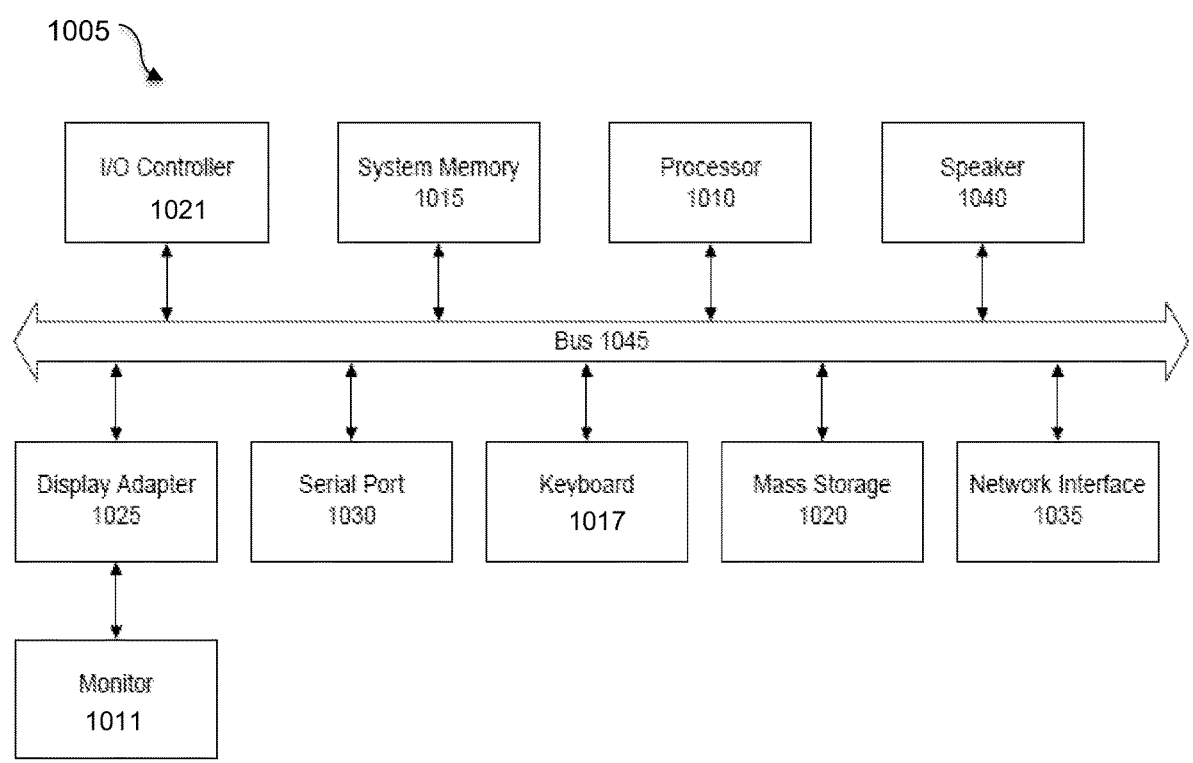
FIG. 5 is a system block diagram of a computer system used to execute one or more software components of the described systems and processes, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 5 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is only one example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method, comprising:
    monitoring a time of a system administration event in a data storage system, wherein the system administration event comprises one of: a creation of a security officer role in the data storage system, a change of system time of the data storage system, and a disabling of alerts in the data storage system;
    determining whether or not a data destruction command is attempted within a time window after the system administration event;
    checking for one or more de-risking factors justifying attempting the data destruction command within the time window, wherein the de-risking factors comprise a recency of installation or re-installation of the data storage system and a percentage amount of data capacity ingestion in the data storage system;
    allowing the data destruction command to execute if it is attempted after the time window and there are no de-risking factors; and
    disallowing the data destruction command from executing if it is attempted within the time window and there are de-risking factors.

2. The method of claim 1 further comprising sending an alert to the user if the data destruction command is attempted within the time window.

3. The method of claim 1 wherein the security officer role comprises assignment of a person to authorize data destruction operations initiated by the data destruction command, and wherein the data destruction command is issued by a system administrator of the data storage system.

4. The method of claim 3 wherein the data destruction operations comprise part of a system installation, re-installation, configuration, or re-configuration operation.

5. The method of claim 1 wherein the data storage system comprises part of a deduplication backup process executed by a data storage server running a Data Domain file system (DDFS).

6. The method of claim 1 wherein the time window is on the order of one day to three days.

7. A method of assessing risk of a data destruction operation in a data storage system, comprising:
- monitoring a respective time of a plurality of data system operating events, wherein the plurality of data system operating events comprise: a creation of a security officer role in the data storage system, a change of system time of the data storage system, and a disabling of alerts in the data storage system;
- first determining if the data destruction operation is attempted within a defined time window of any event time of a data system operating event of the plurality of data system operating events;
- second determining if any de-risking factor applies to justify the data destruction operation attempted within the defined time window, wherein the de-risking factors comprise a recency of installation or re-installation of the data storage system and a percentage amount of data capacity ingestion in the data storage system; and
- allowing the data destruction operation if a result of the first determining step is true and a result of the second determining step is false, otherwise disallowing the data destruction operation until after the defined time window.

8. The method of claim 7 further comprising sending an alert to the user if the result of the first determining step is true and a result of the second determining step is false.

9. The method of claim 1 wherein the security officer role comprises assignment of a person to authorize data destruction operations initiated by the data destruction command, and wherein the data destruction command is issued by a system administrator of the data storage system.

10. The method of claim 9 wherein the data destruction operations comprise part of a system installation, re-installation, configuration, or re-configuration operation.

11. The method of claim 1 wherein the recency comprises a time period of five days or less, and wherein the percentage amount comprises two percent or less.

12. The method of claim 11 wherein the time window is on the order of one day to three days.

13. The method of claim 7 wherein the data storage system comprises part of a deduplication backup process executed by a data storage server running a Data Domain file system (DDFS).

14. A method of dynamically assessing risk of a data loss in a data storage system, comprising:
- receiving a data destruction command required to be issued by a system administrator and authorized by a security officer;
- determining if the data destruction command is issued within a time window of a time of at least one of a plurality of data system operating events, wherein the plurality of data system operating events comprise: a creation of a security officer role in the data storage system, a change of system time of the data storage system, or a disabling of alerts in the data storage system;
- blocking the data destruction command from executing until after the time window if it is attempted within the time window and if no de-risking condition applies, wherein the de-risking factors comprise a recency of installation or re-installation of the data storage system and a percentage amount of data capacity ingestion in the data storage system; and
- allowing the data destruction command to execute if it is attempted after the time window or if the de-risking condition applies even if the data destruction command is attempted within the time window.

* * * * *